US012602735B2

(12) United States Patent
Kim et al.

(10) Patent No.: US 12,602,735 B2
(45) Date of Patent: Apr. 14, 2026

(54) GRAPH DATA CALCULATION METHOD AND APPARATUS

(71) Applicant: KOREA ADVANCED INSTITUTE OF SCIENCE AND TECHNOLOGY, Daejeon (KR)

(72) Inventors: Min-Soo Kim, Daejeon (KR); Seyeon Oh, Daegu (KR); Donghyoung Han, Daejeon (KR); Inju Na, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 305 days.

(21) Appl. No.: 18/463,386

(22) Filed: Sep. 8, 2023

(65) Prior Publication Data

US 2024/0087076 A1 Mar. 14, 2024

(30) Foreign Application Priority Data

Sep. 8, 2022 (KR) ........................ 10-2022-0114369
Nov. 9, 2022 (KR) ........................ 10-2022-0148785

(51) Int. Cl.
*G06T 1/20* (2006.01)
*G06F 16/901* (2019.01)
*G06T 1/60* (2006.01)

(52) U.S. Cl.
CPC ............ *G06T 1/20* (2013.01); *G06F 16/9024* (2019.01); *G06T 1/60* (2013.01)

(58) Field of Classification Search
CPC ......... G06F 16/9024; G06T 1/20; G06T 1/60; G06T 11/206

USPC .......................................................... 345/501
See application file for complete search history.

(56) References Cited

U.S. PATENT DOCUMENTS

| 2016/0063132 A1* | 3/2016 | Chen | ................... | G06F 16/9024 |
| | | | | 707/609 |
| 2020/0226124 A1* | 7/2020 | Chishti | ............... | G06F 16/9024 |
| 2020/0387548 A1* | 12/2020 | Han | .................. | G06F 16/90335 |
| 2023/0004977 A1* | 1/2023 | Cepek | ................. | G06F 16/9024 |

OTHER PUBLICATIONS

Office Action for Korean Patent Application No. 10-2022-0148785 Mailed Apr. 16, 2025, 13 pages (with English translation).
Rungsawang A. et al., "Fast PageRank Computation on a GPU Cluster," Department of Computer Engineering, Faculty of Engineering, Kasetsart University, Bangkok 10900, Thailand 2012 20th Euromicro International Conference on Parallel, Distributed and Network-based Processing, 7 pages.

(Continued)

*Primary Examiner* — Jacinta M Crawford
(74) *Attorney, Agent, or Firm* — Kilpatrick Townsend & Stockton LLP

(57) ABSTRACT

Provided are a graph data calculation method and apparatus. A computing device divides graph data including a source vertex and a destination vertex of an edge into a plurality of blocks, and identifies an out-degree of each vertex. Next, the computing device repeatedly performs a process of calculating, in units of blocks, a weight of a destination vertex of each edge by using a pagerank and an out-degree of a source vertex of each edge existing in a block, and updating a pagerank of each vertex of the graph data by accumulating a weight of a destination vertex of each block.

15 Claims, 27 Drawing Sheets

(56) References Cited

OTHER PUBLICATIONS

Xing W. et al., Weighted Page Rank Algorithm, Faculty of Computer Science, University of New Brunswick, Fredericton, NB, E3B 5A3, Canada, Proceedings Second Annual Conference on Communication Networks and Services Research, 2004, 10 pages.

* cited by examiner

| Software | Hardware | | Example: V100 | |
|---|---|---|---|---|
| thread | core | | threads/core | 32 |
| block | Streaming Multiprocessor (SM) | | number of cores per SM | FP32 | 63 |
| | | | | FP64 | 32 |
| | | | | Tensor | 8 |
| grid | GPU | | number of SMs | 84 |

FIG. 27

| Dataset | # vertices | # edges | Grid size | Processing time (second) |
|---|---|---|---|---|
| RMAT28 | 268.4 M | 4.2 B | 9.17 GB | 3.16 |
| RMAT29 | 536.9 M | 8.5 B | 18.81 GB | 4.38 |
| RMAT30 | 1.1 B | 17.0 B | 37.67 GB | 8.31 |
| RMAT31 | 2.1 B | 34.0 B | 76.38 GB | 18.56 |
| RMAT32 | 4.2 B | 68.5 B | 169.68 GB | 50.19 |
| RMAT33 | 8.4 B | 137.0 B | 335.45 GB | 122.29 |
| RMAT34 | 17.2 B | 273.5B | 705.7GB | 274.17 |
| RMAT35 | 34.4 B | 545.4 B | 1.4 TB | 831.87 |
| RMAT36 | 68.7 B | 1.1 T | 3.1 TB | 1380 (23 minutes) |

GRAPH DATA CALCULATION METHOD AND APPARATUS

CROSS-REFERENCE TO RELATED APPLICATION

This application is based on and claims priority under 35 U.S.C. § 119 to Korean Patent Application Nos. 10-2022-0114369 and 10-2022-0148785, respectively filed on Sep. 8, 2022 and Nov. 9, 2022, in the Korean Intellectual Property Office, the disclosures of which are incorporated by reference herein in their entirety.

BACKGROUND

1. Field

Embodiments of the disclosure relate to a graph data calculation method and apparatus, and more particularly, to a method and apparatus for obtaining a pagerank indicating a relative importance between vertices in a graph consisting of vertices and edges.

2. Description of the Related Art

Various types of data may be represented as graphs consisting of vertices and edges. For example, data in various industries such as web page, social networking service (SNS), communication, finance, and bio/healthcare are related to each other, and a relationship between these data may be represented as a graph consisting of vertices and edges. Also, a search engine using a method of representing web pages as vertices, representing hyperlinks between web pages as edges, and then measuring a relative importance between the web pages has been developed by Google.

As the amount of data is rapidly increasing, the size of a graph representing such data is also increasing. As the size of such a graph increases, it is difficult to load and calculate the entire graph data into a memory at once. For example, it is difficult to load and calculate a graph including 1 trillion edges into a memory at once, and it takes a lot of resources and time to calculate a relative importance between vertices.

SUMMARY

Embodiments of the disclosure provide a graph data calculation method and apparatus capable of reducing a time required to calculate a relative importance between vertices in a graph.

Additional aspects will be set forth in part in the description which follows and, in part, will be apparent from the description, or may be learned by practice of the presented embodiments.

According to an embodiment of the disclosure, a graph data calculation method used by a computing device including one or more memories, one or more processors, and one or more input/output devices to calculate a graph including vertices and edges includes dividing graph data including a source vertex and a destination vertex of each edge into a plurality of blocks, identifying an out-degree of each vertex, calculating, in units of blocks, a weight of a destination vertex of each edge by using a pagerank and an out-degree of a source vertex of each edge existing in a block, and updating the pagerank of each vertex of the graph data by accumulating weights of a destination vertices of each block.

According to an embodiment of the disclosure, a computing device includes a main memory storing a plurality of blocks into which graph data including source vertices and destination vertices of edges are divided, an out-degree of each vertex, and a pagerank of each vertex, one or more graphics processing units (GPUs) configured to calculate, in units of blocks, a weight of a destination vertex of each edge by using a pagerank and an out-degree of a source vertex of each edge existing in a block, and a processor configured to update a pagerank of each vertex of the graph data by accumulating weights of a destination vertices of each block.

BRIEF DESCRIPTION OF THE DRAWINGS

The above and other aspects, features, and advantages of certain embodiments will be more apparent from the following description taken in conjunction with the accompanying drawings, in which:

FIGS. 14 to 16 are diagrams illustrating a method of performing graph calculation by using a graphics processing unit (GPU), according to an embodiment of the disclosure;

FIG. 17 is a diagram illustrating a hardware and software structure of a GPU, according to an embodiment of the disclosure;

FIG. 27 is a diagram illustrating an experimental example of calculation performance when a graph calculation method according to an embodiment of the disclosure is applied.

DETAILED DESCRIPTION

Figure 1:
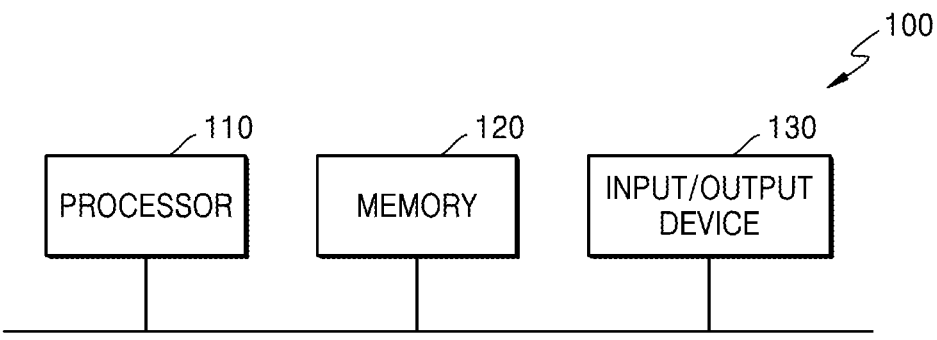
FIG. 1 is a diagram illustrating a computing device for graph data calculation, according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A graph data calculation method and apparatus according to an embodiment of the disclosure will be described in detail with reference to the accompanying drawings.

FIG. 1 is a diagram illustrating a computing device for graph data calculation, according to an embodiment of the disclosure.

Referring to FIG. 1, a computing device 100 for processing a graph represented by a plurality of vertices and a plurality of edges includes one or more processors 110, one or more memories 120, and one or more input/output devices 130. In an embodiment, the computing device 100 may further include one or more graphics processing units (GPUs). The present embodiment is only an example for better understanding of the computing device 100, and thus, an embodiment of the disclosure is not necessarily limited to a structure of FIG. 1. Any of various types of devices for storing and processing data may be implemented as the computing device 100 of the present embodiment. Also, each operation performed by the computing device 100 may be implemented by software, may be loaded into the memory 120 (e.g., a main memory or a GPU memory), and then may be performed by the processor 110 (a central processing unit (CPU) or a GPU).

Figure 2:
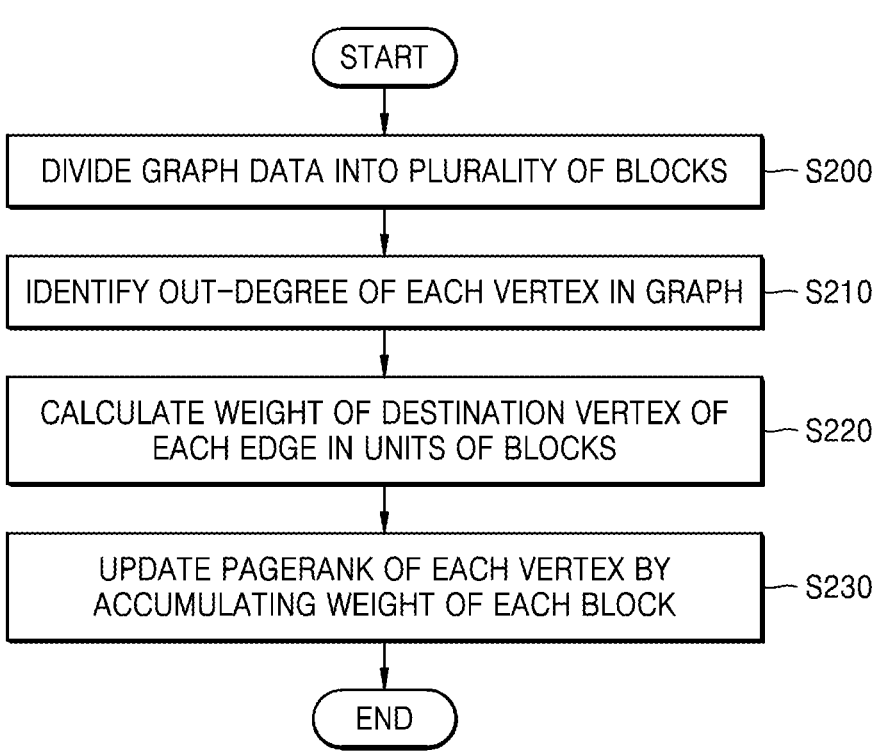
FIG. 2 is a flowchart illustrating a graph data calculation method, according to an embodiment of the disclosure.

FIG. 2 is a flowchart illustrating a graph data calculation method, according to an embodiment of the disclosure.

Referring to FIG. 2, the computing device 100 divides graph data including a source vertex and a destination vertex of each edge into a plurality of blocks (S200). In an embodiment, the computing device 100 may divide graph data into a plurality of blocks based on a source vertex and/or a destination vertex. An example of dividing graph data represented as an adjacency matrix 310 of FIG. 3 based on a source vertex and a destination vertex is illustrated in FIG. 4.

The computing degree 100 identifies an out-degree of each vertex existing in a graph (S210). The term "out-degree" refers to the number of edges directed from one vertex to other vertices.

The computing device 100 calculates, in units of blocks, a weight of a destination vertex of each edge (e.g., weight=pagerank/out-degree) by using a pagerank and an out-degree of a source vertex of each edge existing in a block (S220). For example, when graph data is divided into N blocks, a process of calculating a weight of each block may be independently performed. An example of a method of calculating a weight in units of blocks by using an adjacency matrix is illustrated in FIGS. 5 to 12.

Figure 13:
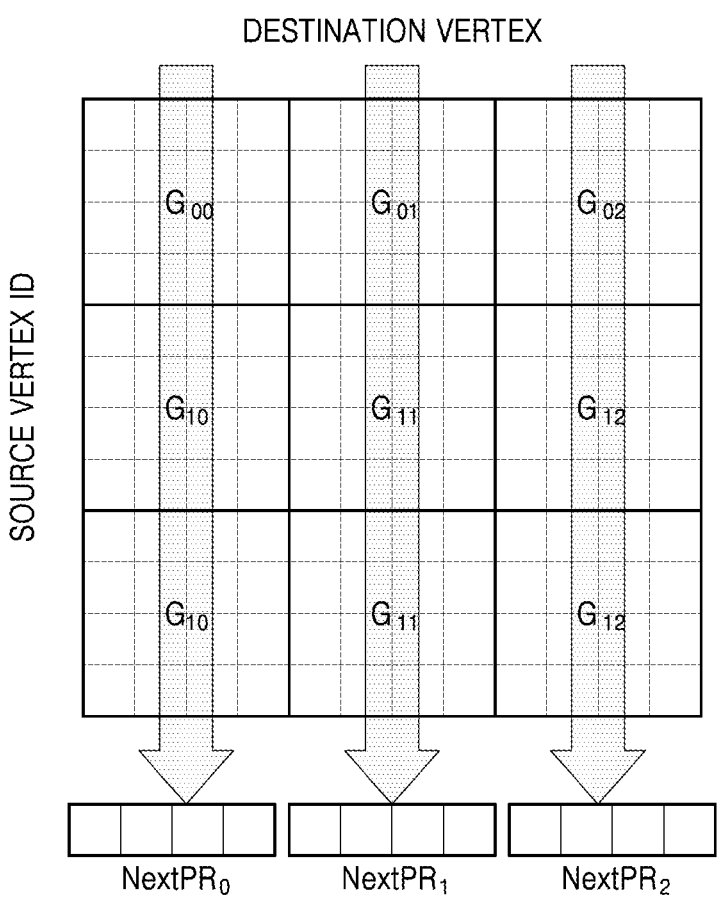
FIG. 13 is a diagram illustrating a block calculation order, according to an embodiment of the disclosure.

The computing device 100 updates a pagerank of each vertex of the graph data by accumulating weights of destination vertices of each block (S230). In an embodiment, the computing device 100 may process the plurality of blocks according to a predefined order, as shown in FIG. 13.

In another embodiment, the computing device may calculate a weight in units of blocks by using one or more GPUs, as shown in FIGS. 14 to 26.

Figure 3:
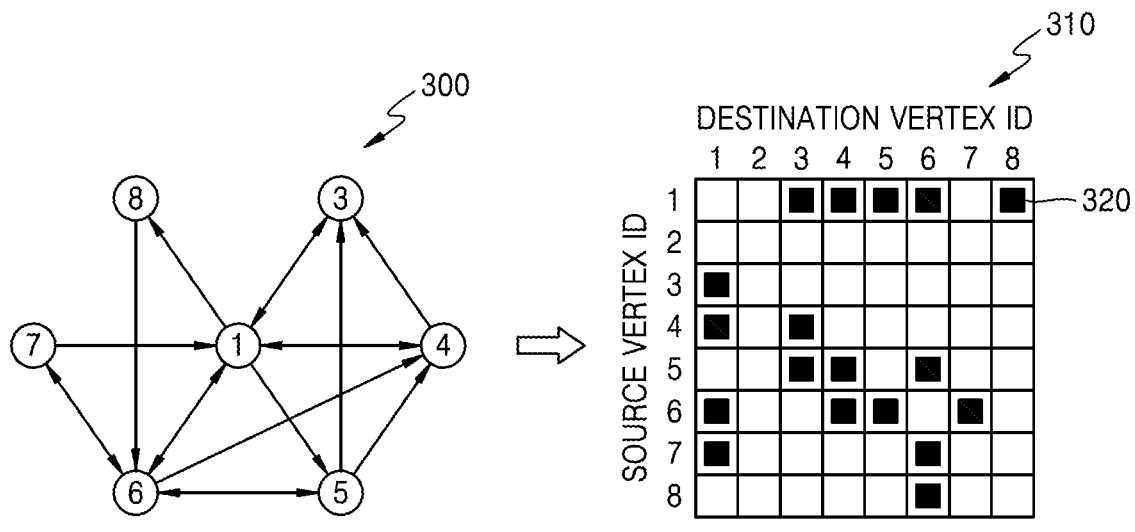
FIG. 3 is a diagram illustrating a format of graph data, according to an embodiment of the disclosure.
Figure 4:
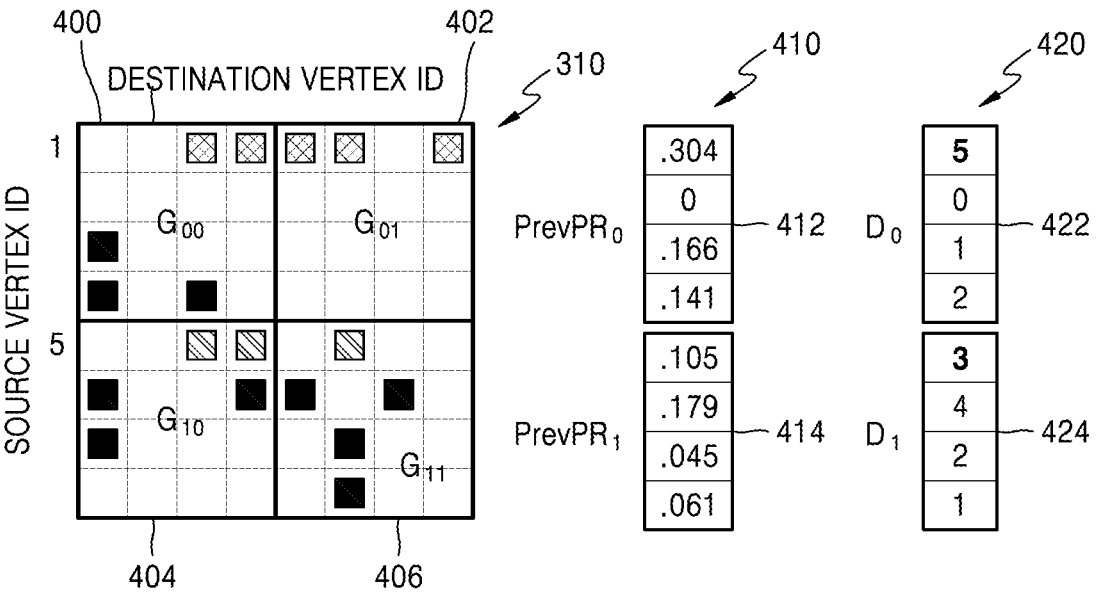
FIG. 4 is a diagram illustrating a method of dividing graph data, according to an embodiment of the disclosure.

FIG. 3 is a diagram illustrating a format of graph data, according to an embodiment of the disclosure.

Referring to FIG. 3, a graph 300 includes a plurality of vertices and a plurality of edges. For example, an edge may have a direction or may not have a direction. However, hereinafter, the following will be described based on a directed graph.

Information about a source vertex Vi and a destination vertex Vj of the graph 300 may be represented in the format of (Vi, Vj). Alternatively, the graph 300 may be represented in the format of an adjacency matrix 310 in which source vertices and destination vertices of edges are expressed in rows and columns. For example, because there is an edge directed from vertex 1 to vertex 8, the edge may be expressed as (1,8). This may be expressed as a predefined value (e.g., '1') at coordinates (1,8) 320 of the adjacency matrix 310. A portion of the adjacency matrix 310 where no edge exists may be expressed as a predefined value (e.g., '0'). For better understanding, in the present embodiment, an element (320) with an edge in the adjacency matrix 310 is displayed as a square box, and an element with no edge is displayed as an empty space.

In an embodiment, identification information expressed in numbers or characters may be assigned to vertices existing in the graph 300. For example, numbers that sequentially increase from a predefined number (e.g., 1) may be assigned to vertices of the graph 300. In addition, a form of vertex identification information may be modified in various ways.

The adjacency matrix 310 of the present embodiment is only an example of representing graph data, and thus, an embodiment of the disclosure is not necessarily limited thereto. However, for convenience of explanation, the following will be described assuming that graph data is represented in the format of the adjacency matrix 310.

FIG. 4 is a diagram illustrating a method of dividing graph data, according to an embodiment of the disclosure.

Referring to FIG. 4, graph data is divided into a plurality of blocks. For example, because graph data is a set of information about vertices and edges, the computing device 100 may divide the graph data into a plurality of blocks according to predefined various criteria such as a source vertex and/or a destination vertex.

When graph data is represented as the adjacency matrix 310, the computing device 100 may generate a plurality of blocks 400, 402, 404, and 406 by dividing the adjacency matrix 310 in a lattice shape. For example, the computing device 100 may recursively perform a process of dividing the adjacency matrix 310 into quarters. Although the adjacency matrix 310 is quartered once in the present embodiment, a process of quartering a region generated by quartering (e.g., Goo) and then quartering a resulting region again may be recursively and repeatedly performed.

In an embodiment, the computing device 100 may divide the graph data so that the size of the final blocks 400, 402, 404, and 406 generated by recursive division is equal to or less than a predefined size. For example, when the computing device 100 processes the graph data by using a GPU, the computing device 100 may divide the graph data so that the size of the blocks 400, 402, 404, and 406 is equal to or less than the size of a GPU memory.

The computing device 100 may generate an out-degree 420 of each vertex for each block. For example, the computing device 100 may generate out-degree information 422 and 424 for each block including out-degrees of source vertices of edges existing in each of blocks 400, 402, 404, and 406. Because there are a total of four blocks 400, 402, 404, and 406 in the present embodiment but source vertices of the $G_{00}$ and $G_{01}$ blocks 400 and 402 are the same and source vertices of the, $G_{10}$ and $G_{11}$ blocks 404 and 406 are the same, there is a total of two out-degree information 422 and 424 for each block. The out-degree information 422 and 424 for each block may be represented as a column matrix (e.g., a vector).

There is a pagerank 410 of each vertex of a graph. The pagerank 410 is a value indicating a relative importance between vertices. Although the term "pagerank" is used as a term indicating a relative importance in the present embodiment, this is not limited to PageRank, the same term previously used in Google. The pagerank 410 of the present embodiment may be defined as any of various types of values capable of indicating a relative importance between vertices.

In an embodiment, in the present embodiment, a relative importance between vertices may be calculated by using an out-degree of a vertex and an average of pageranks of adjacent vertices connected to the vertex. That is, it may be determined that when values of pageranks of adjacent vertices connected to a first vertex are high, a relative importance of the first vertex is high.

Initially, the pagerank 410 of each vertex may be set to an arbitrary value, or a predefined value (e.g., '1') may be assigned. The computing device 100 may repeatedly perform a process of updating the current pagerank 410 of each vertex of the graph by using a method described with reference to FIG. 2. When the updating process is repeatedly performed, a value of the pagerank 410 of each vertex may converge to a specific value. The number of times a pagerank calculation process is repeatedly performed may be set in various ways according to embodiments. For example, a process of updating the pagerank 410 may be repeatedly performed a predefined number of times or may be repeatedly performed until a change amount of the pagerank 410 of each vertex is less than a certain value (i.e., when almost reaching a convergence value).

A pagerank updating process is the same every time. Accordingly, it is assumed that the pagerank 410 of each vertex obtained as a result of performing an $N^{th}$ updating process is the same as in FIG. 4, and a method of performing an $N+1^{th}$ updating process will be described.

FIGS. 5 to 11 are diagrams illustrating a method of updating a pagerank of a graph, according to an embodiment of the disclosure.

Referring to FIGS. 5 to 8, the computing device 100 performs calculation on the $G_{00}$ block 400. The computing device 100 calculates a weight of a destination vertex of the $G_{00}$ block 400 by using graph data of the $G_{00}$ block 400 (i.e., information of edges), the out-degree information 422 of a source vertex of the $G_{00}$ block 400, and pagerank information 412 of the source vertex of the $G_{00}$ block 400.

Figure 5:
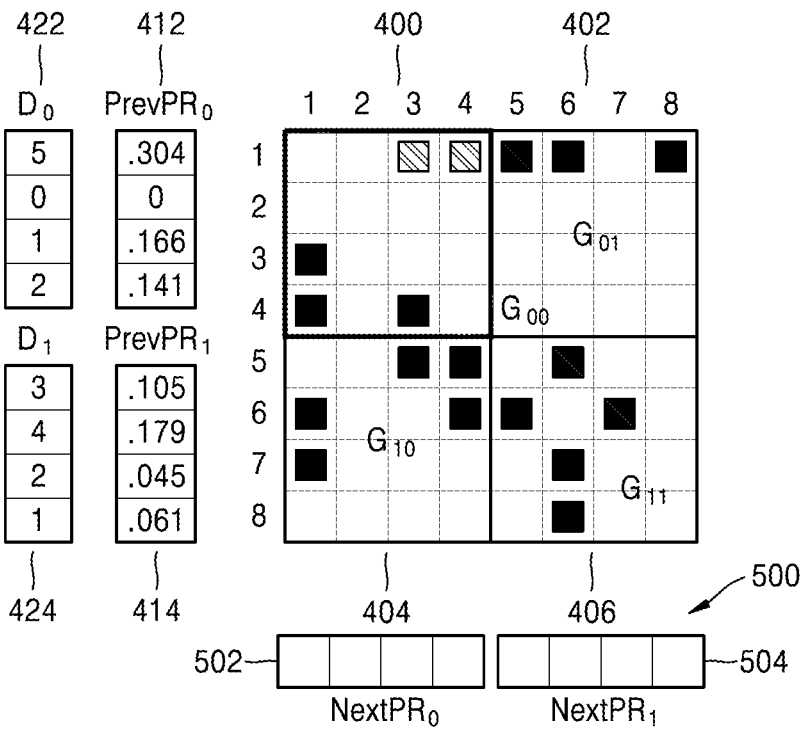
FIGS. 5 to 11 are diagrams illustrating a method of updating a pagerank of a graph, according to an embodiment of the disclosure.
Figure 6:
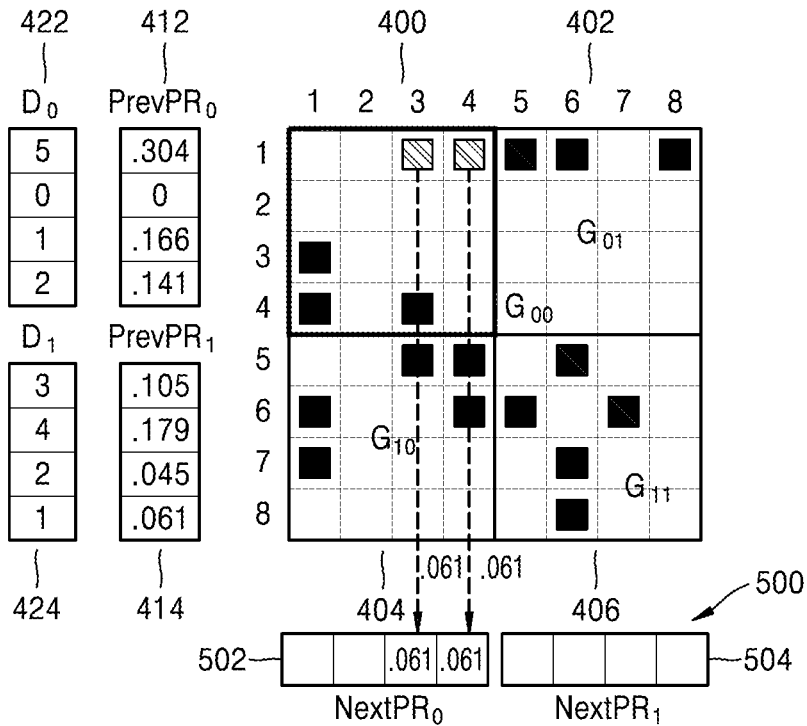

For example, the computing device 100 identifies two edges located in a first row of the $G_{00}$ block 400 (FIG. 5), and identifies and stores a weight of 0.61 (=0.304/5) of a destination vertice of the two edges by using an out-degree of 5 and a pagerank of 0.304 of a source vertex of the first row (FIG. 6). In an embodiment, the computing device 100 may include a row vector 502 corresponding in a one-to-one manner to a column of the $G_{00}$ block 400 to accumulate and store a weight of a destination vertex.

Figure 7:
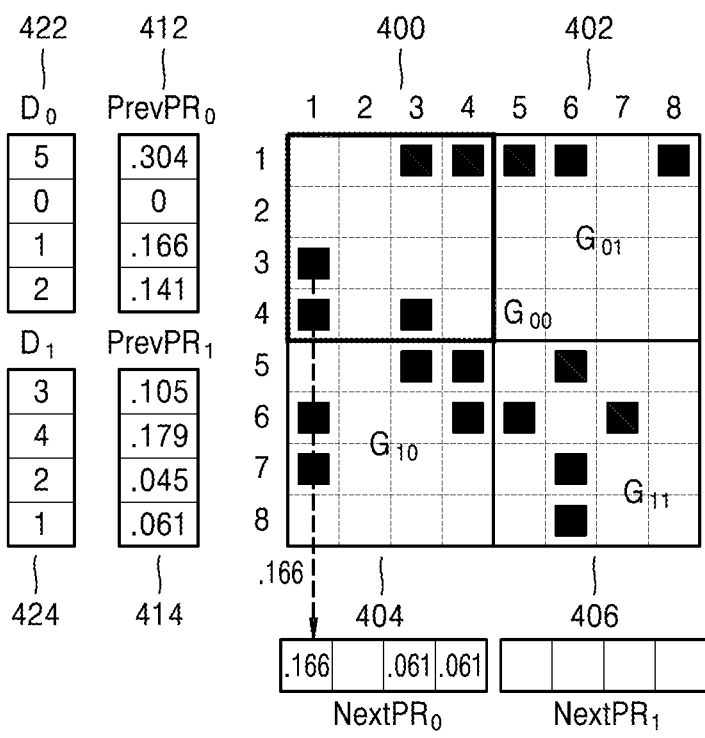

Because there is no edge in a second row, the computing device 100 calculates a weight of an edge existing in a third row (FIG. 7). That is, the computing device 100 obtains a weight of 0.116 (=0.166/1) of a destination vertex of an edge by using a pagerank of 0.166 and an out-degree of 1 of a source vertex of the third row, and accumulates and stores the weight in the row vector 502.

Figure 8:
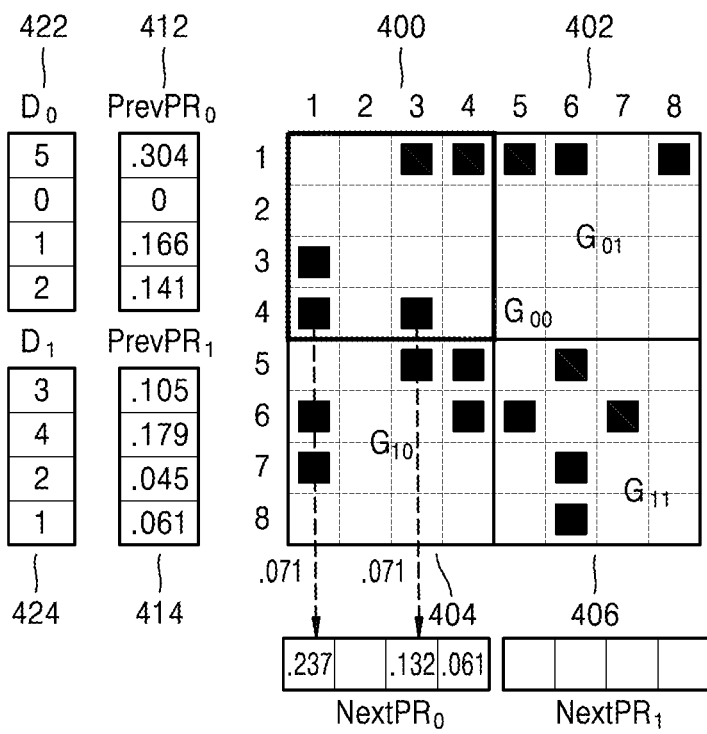

Next, the computing device 100 obtains a weight of 0.071 (=0.141/2) corresponding to a destination vertex of an edge existing in a fourth row of the $G_{00}$ block 400 (FIG. 8). The computing device 100 accumulates and stores the weight of the destination vertex of the edge of the fourth row in the row vector 502. For example, because the weight of the destination vertex of each edge existing in the first to third rows is stored in the row vector 502, the computing device

100 accumulates and stores the weight of 0.071 obtained in the fourth row in the row vector (0.237=0.166+0.71, 0.132=0.061+0.071).

Figure 9:
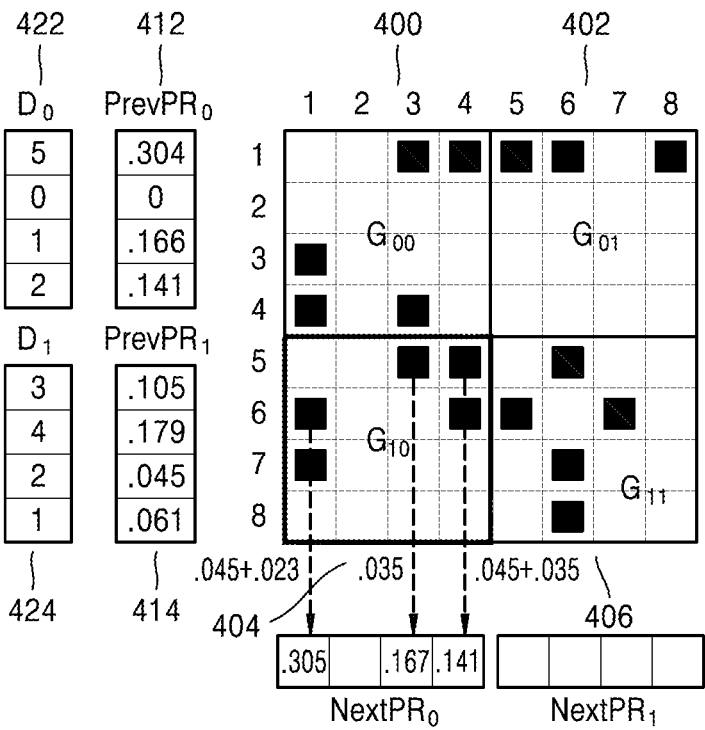

Referring to FIG. 9, when the calculation of the weight of the $G_{00}$ block 400 is completed, the computing device 100 calculates a weight of the $G_{10}$ block 404. Because destination vertices of the $G_{00}$ block 400 the $G_{10}$ block 404 are the same, the computing device 100 accumulates and stores each weight obtained in the Gm block 404 in the row vector 502 used in the $G_{00}$ block.

Figure 10:
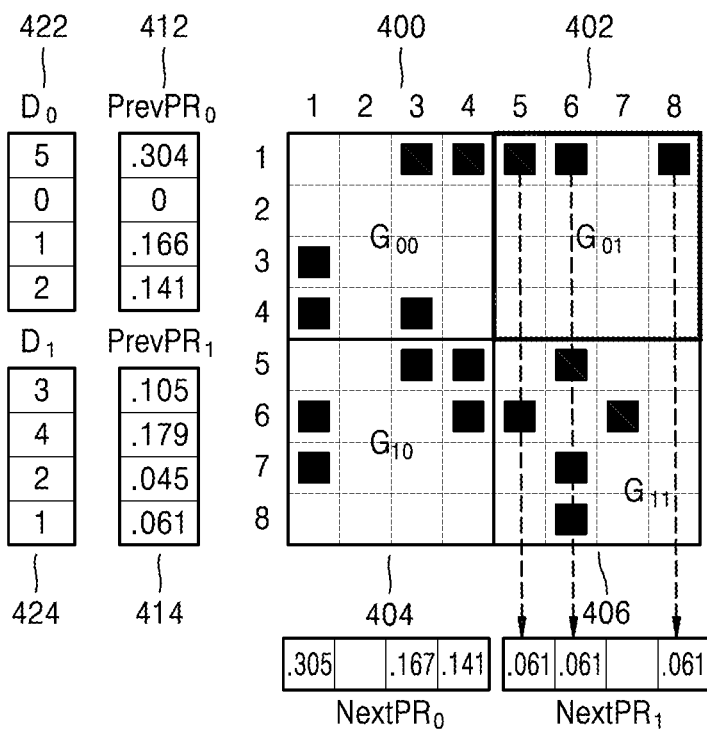

Referring to FIG. 10, the computing device 100 calculates a weight of the $G_{01}$ block 402. A method of calculating a weight of the $G_{01}$ block 402 is the same as the method described with reference to FIGS. 5 to 8. However, because a destination vertex of the $G_{01}$ block 402 and a destination vertex of the $G_{00}$ block are different from each other, the computing device 100 accumulates and stores a weight obtained for the $G_{01}$ block 402 in a row vector 504 for the $G_{01}$ block 402.

Figure 11:
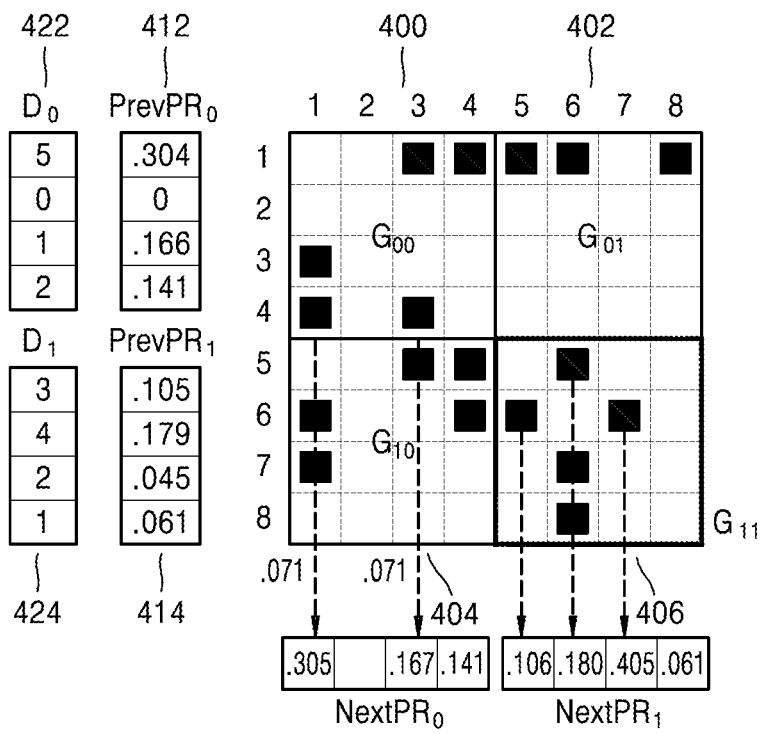

Referring to FIG. 11, when the calculation of the weight of the $G_{01}$ block 402 is completed, the computing device 100 calculates a weight of the $G_{11}$ block 406. The computing device 100 calculates the weight in the same manner as the method described with reference to FIG. 9 and accumulates and stores the weight in the row vector 504.

Figure 12:
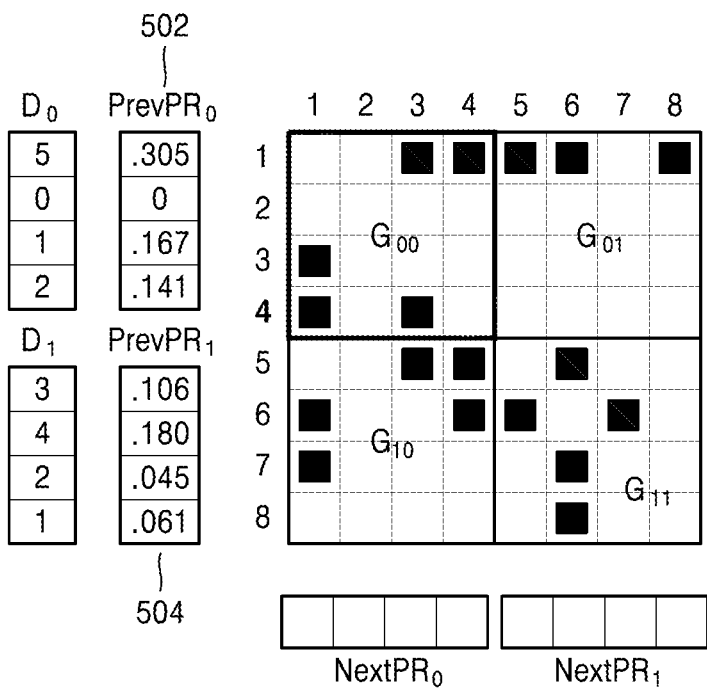
FIG. 12 is a diagram illustrating a process of repeatedly calculating a pagerank of a graph, according to an embodiment of the disclosure.

FIG. 12 is a diagram illustrating a process of repeatedly calculating a pagerank of a graph, according to an embodiment of the disclosure.

Referring to FIG. 12, an accumulated value 500 of weights of destination vertices obtained in FIG. 11 becomes a new pagerank of each vertex of a graph. In other words, the first row vector 502 obtained in FIG. 11 becomes a new pagerank of a source vertex of the $G_{00}$ and $G_{01}$ blocks of the present embodiment, and the second column vector 504 obtained in FIG. 11 becomes a new pagerank of a source vertex of the $G_{10}$ and $G_{11}$ blocks of the present embodiment.

The pageranks 412 and 414 of FIG. 5 are replaced with values of the column vectors 502 and 504 of FIG. 11 finally generated by accumulating weights of destination vertices. An out-degree of a source vertex remains unchanged. In other words, the computing device repeatedly performs a process of obtaining a weight by using the method described with reference to FIGS. 5 to 11 by using values of the column vectors 502 and 054 as a new pagerank of a source vertex. The computing device may obtain a pagerank of the graph by repeatedly performing the above process until a predefined condition is satisfied.

FIG. 13 is a diagram illustrating a block calculation order, according to an embodiment of the disclosure.

Referring to FIG. 13, blocks of an adjacency matrix that represents graph data may be calculated in a column direction. As described with reference to FIGS. 4 to 11, the computing device 100 accumulates and stores a weight of a destination vertex of each edge in each block in a column direction. Hence, when blocks are also calculated in a column direction, the computing device may sequentially calculate all accumulations of weights of the same destination vertex. Such a block calculation order helps to perform calculation in units of blocks through a GPU or the like, which will be described again with reference to FIGS. 18 to 26.

Figure 14:
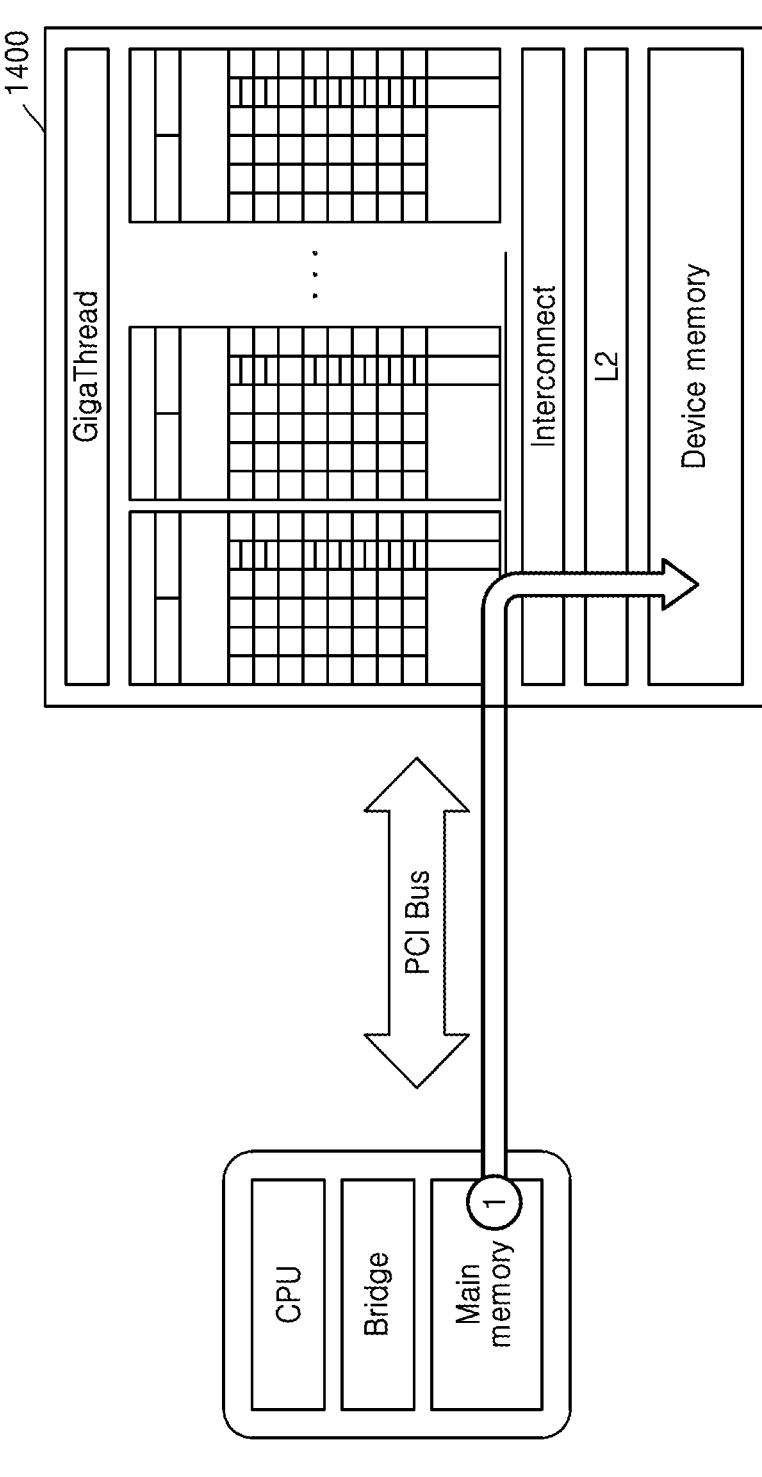
Figure 15:
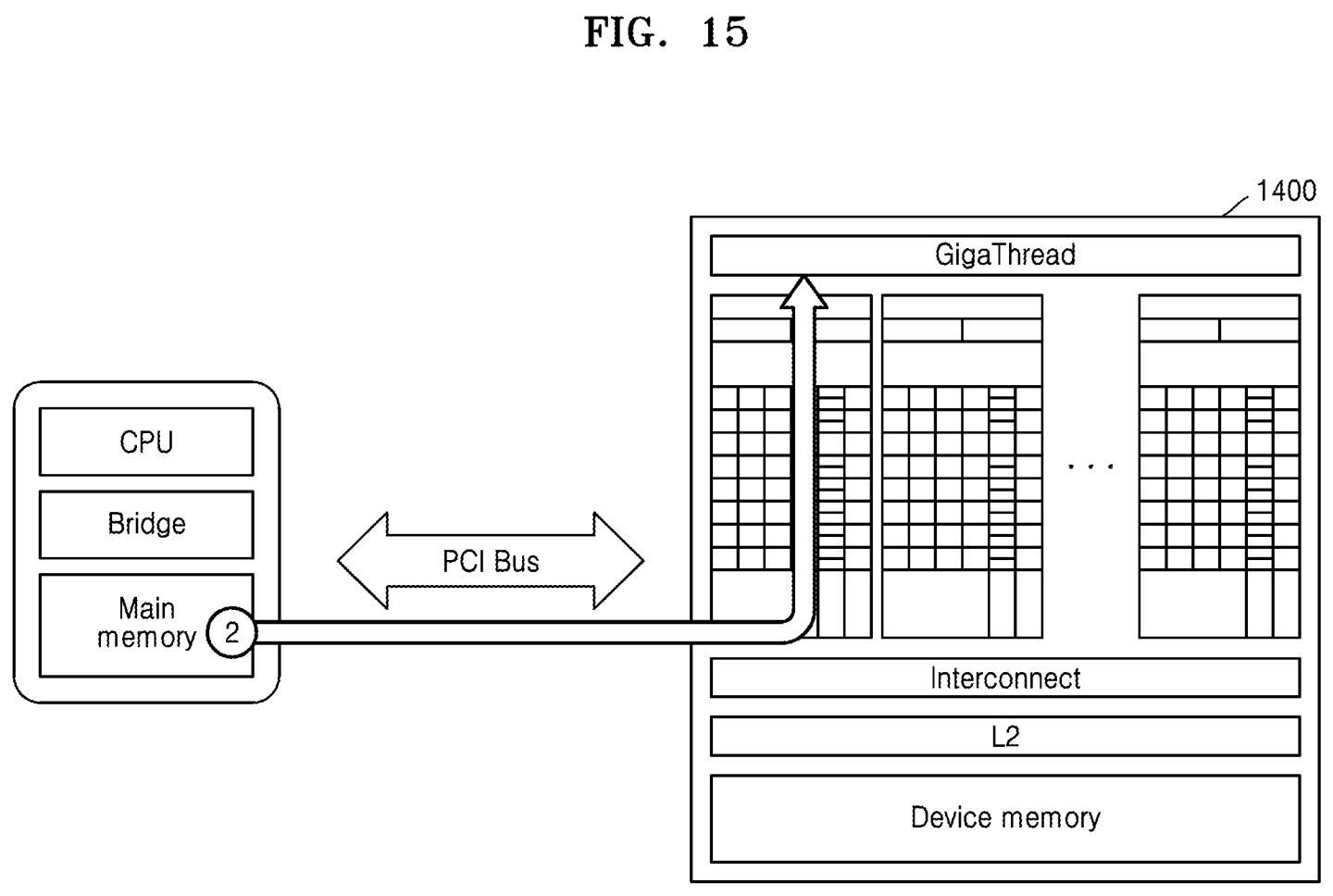
Figure 16:
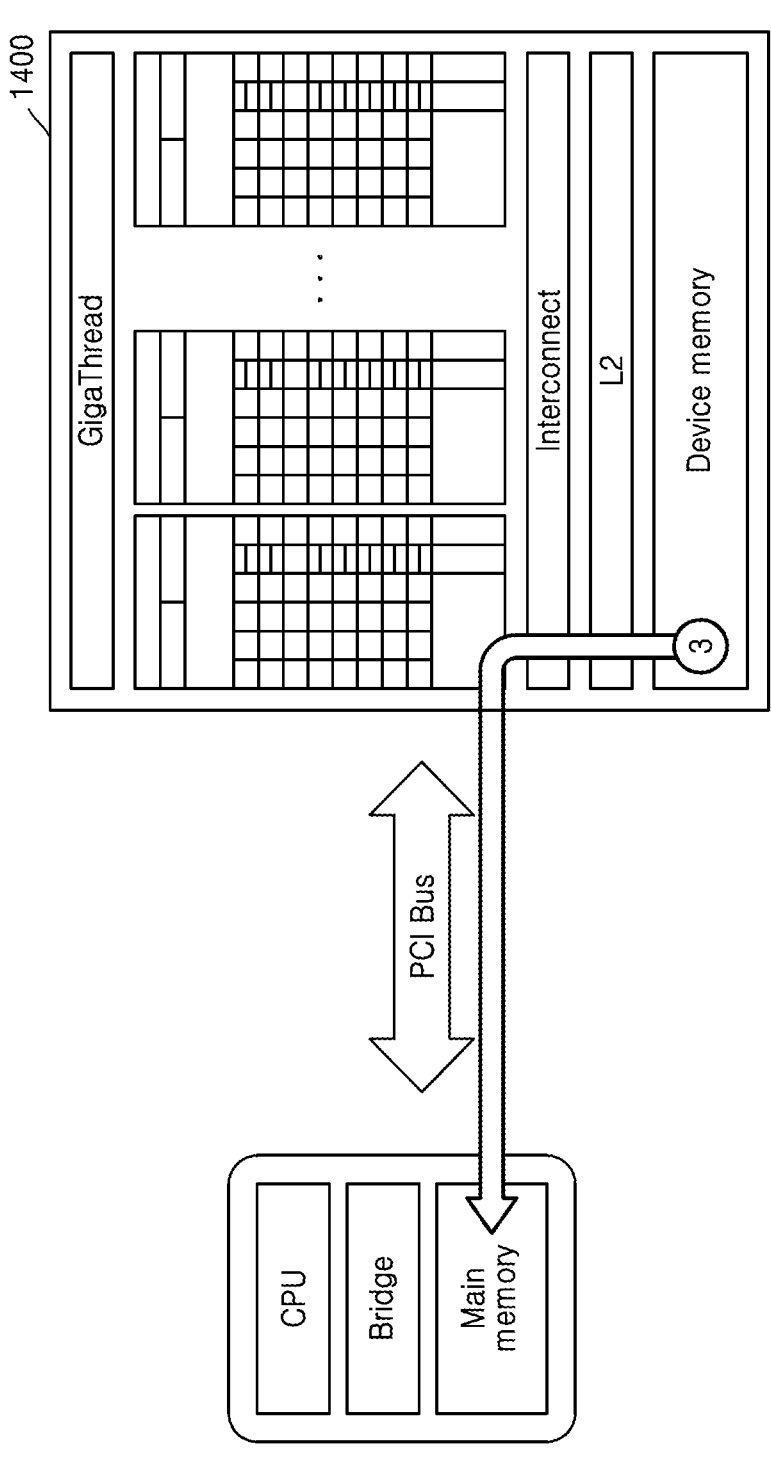

FIGS. 14 to 16 are diagrams illustrating a method of performing graph calculation by using a GPU, according to an embodiment of the disclosure.

Referring to FIGS. 14 to 16 together, the computing device 100 includes one or more GPUs 1400 along with a CPU and a main memory. The GPU 1400 may include a GPU memory and a processing unit for executing one or more threads.

The computing device 100 loads graph data into the main memory (FIG. 14). The graph data is divided into a plurality of blocks as shown in FIG. 4. The CPU loads the graph data existing in the main memory into the memory (GPU memory) of the GPU 1400 in units of blocks. For example, in the example of FIG. 5, the CPU may load, into the GPU memory, block unit data including graph data of the $G_{00}$ block and out-degree information and pagerank information corresponding to the $G_{00}$ block.

The CPU loads a kernel for pagerank calculation into the GPU memory (FIG. 15). When calculation of a weight of the $G_{00}$ block is completed by using the block unit data loaded into the GPU memory, the GPU stores a result in the GPU memory. The CPU copies the result of the calculation of the weight stored in the GPU memory to the main memory (FIG. 16). Next, the CPU may repeatedly perform a process of loading data of the Gm block of the main memory into the GPU, and copying and storing a result to the main memory again.

FIG. 17 is a diagram illustrating a hardware and software structure of a GPU, according to an embodiment of the disclosure.

Referring to FIG. 17, the GPU includes a plurality of streaming multiprocessors SM and each of the SMs includes a plurality of cores. Each core executes one or more threads. Accordingly, the GPU may perform, in parallel, the afore-described process of calculating a weight of each block of graph data by using a plurality of threads. The GPU structure of the present embodiment is only an example for better understanding, and thus, conventional GPUs having various specifications may be applied to the present embodiment.

Figure 18:
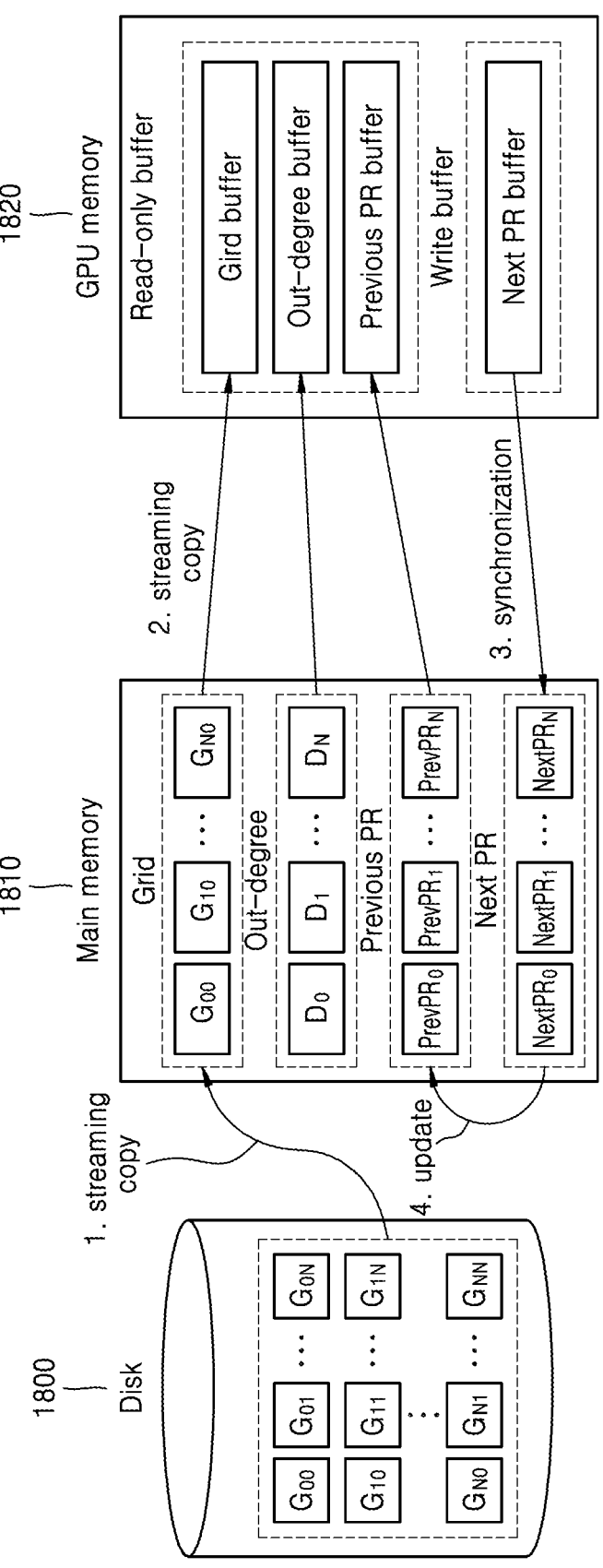
FIG. 18 is a diagram illustrating a graph calculation method using a GPU, according to an embodiment of the disclosure.

FIG. 18 is a diagram illustrating a graph calculation method using a GPU, according to an embodiment of the disclosure.

Referring to FIG. 18, graph data divided into a plurality of blocks exists in an auxiliary storage device 1800. In the present embodiment, the graph data represented in the form of an adjacency matrix is divided into a plurality of blocks.

The computing device 100 loads the graph data into a main memory 1810. When the size of the graph data is large, the computing device 100 may not load the graph data into the main memory at once due to the limitation of the storage capacity of the main memory. Accordingly, the computing device 100 loads one or more blocks into the main memory 1810 by considering the size of the main memory 1810. When block-wise calculation is performed in a column direction as described with reference to FIG. 13, the computing device 100 may load one or more blocks into the main memory 1810 in a column direction.

For example, the computing device 100 loads a plurality of blocks $G_{00}$ to $G_{N0}$ existing in a first column into the main memory 1810. Also, the computing device 100 loads out-degree information required for pagerank calculation and current pagerank information of each vertex into the main memory 1810. According to an embodiment, the computing device 100 may load all of out-degree information and pagerank information of all vertices of the graph data into the memory at once, or may load only out-degree information and pagerank information of vertices required for a block currently loaded into the main memory.

The computing device 100 sequentially loads one or more blocks existing in the main memory 1810 into the GPU memory 1820. Also, the computing device loads out-degree information and pagerank information stored in the main memory 1810 into the GPU memory 1820. The GPU calculates, based on graph data, and outdegree information and pagerank information of a block loaded into the GPU memory 1820, calculates a weight of a destination vertex of the block and stores the weight in a buffer.

The computing device 100 accumulates and stores, in the main memory 1810, information of weights of blocks stored in the GPU memory 1820. When the computing device 100 completes a process of calculating and accumulating weights of the blocks $G_{00}$ to $G_{N0}$ stored in the main memory 1810 through the GPU, the computing device 100 loads next blocks (e.g., $G_{10}$ to $G_{N1}$) into the main memory 1810. When the main memory 1810 does not have out-degree information and pagerank information required for calculation of the blocks $G_{10}$ to $G_{N1}$, the computing device 100 reads the information from the auxiliary storage device 1800 and loads the information into the main memory 1810. Next, the computing device 100 performs weight calculation on the blocks stored in the main memory through the GPU.

In this way, an accumulated stored value of weights of all blocks of the graph data becomes a new pagerank of each vertex.

Figure 19:
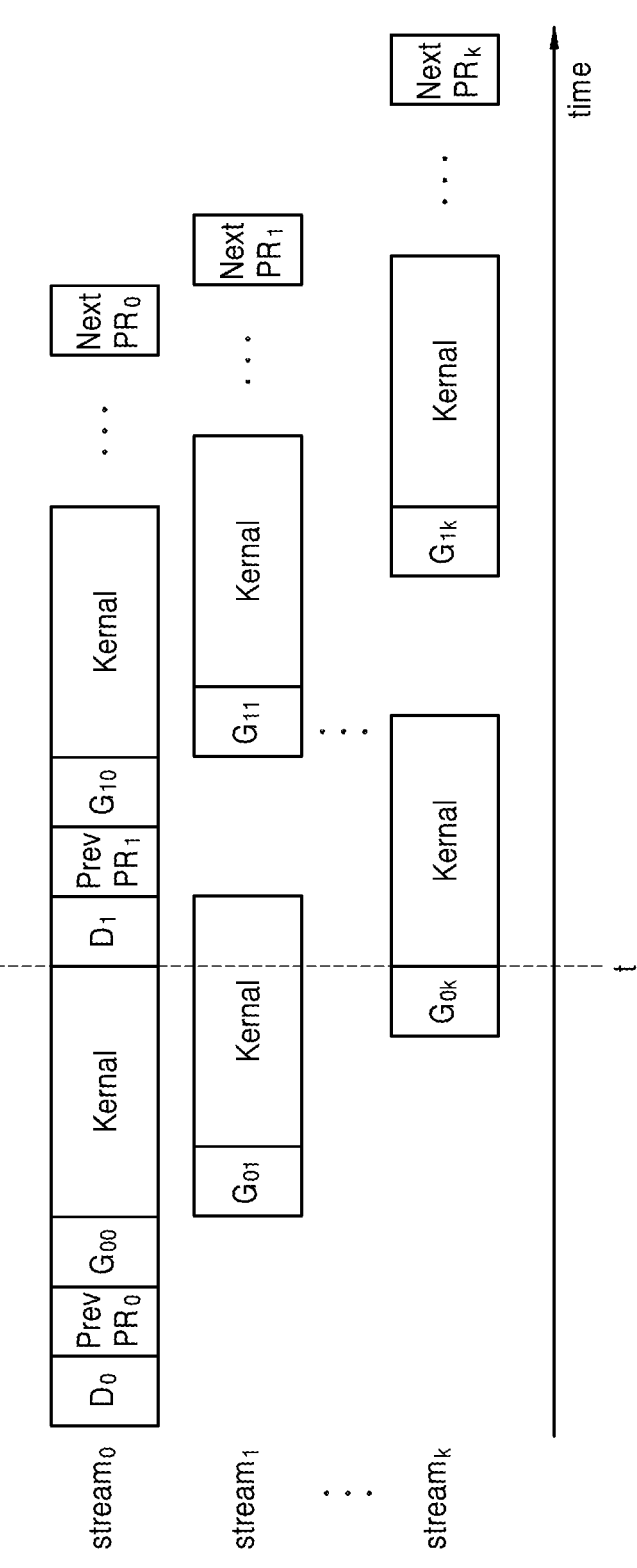
FIGS. 19 and 20 are diagrams illustrating a method of performing graph data calculation in parallel, according to an embodiment of the disclosure.
Figure 20:
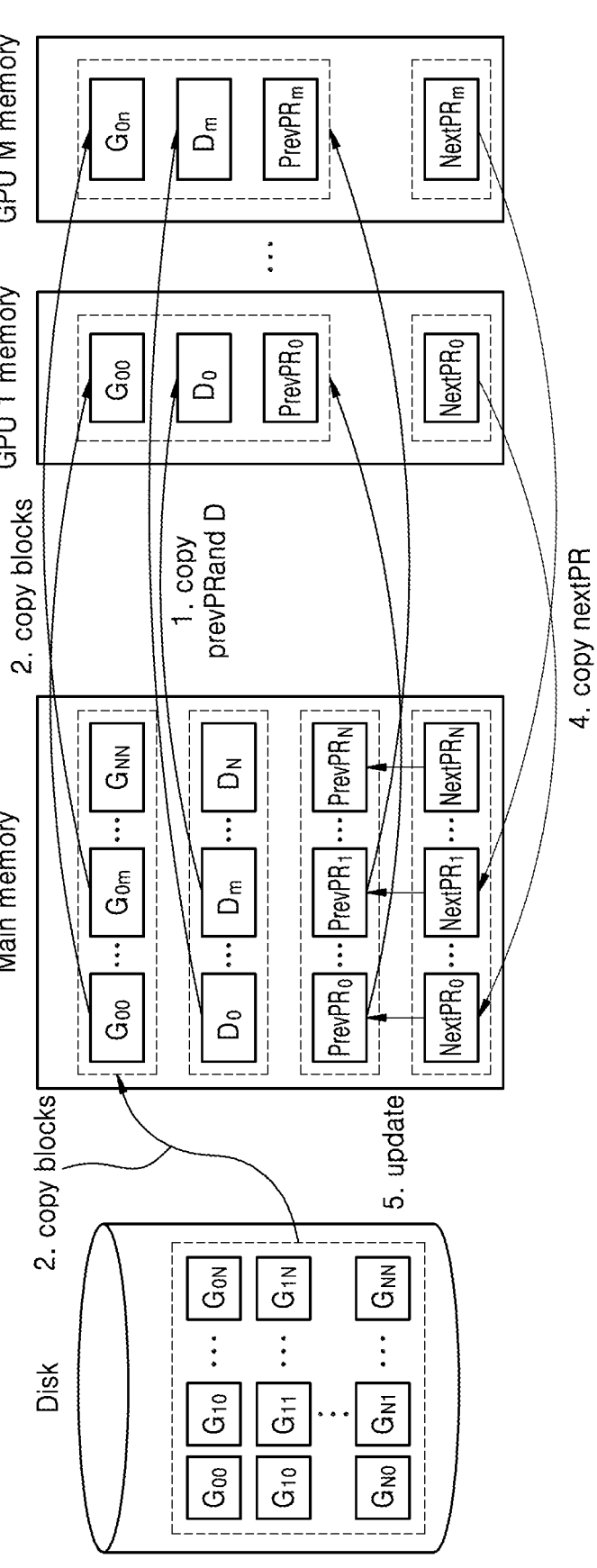

FIGS. 19 and 20 are diagrams illustrating a method of calculating graph data in parallel, according to an embodiment of the disclosure.

Referring to FIGS. 19 and 20, a pagerank of graph data may be calculated in parallel through a plurality of GPUs. As described with reference to FIG. 17, a GPU may include a plurality of cores, and each core may execute one or more threads. For convenience of explanation, the present embodiment will be described assuming that each of a plurality of GPUs processes a stream. The number of streams may vary according to the type and number of GPUs.

The computing device 100 copies block unit data of graph data to a GPU memory through a plurality of streams. When the graph data is divided into a plurality of blocks based on a source vertex and a destination vertex, the computing device 100 loads data of a plurality of blocks including the same destination vertex into the GPU memory through the same stream. For example, when there is graph data divided into a plurality of blocks as shown in FIG. 20, the computing device 100 sequentially loads a plurality of blocks Goo to $G_{N0}$ existing in a first column through a first stream into a first GPU memory and loads a plurality of blocks $G_{01}$ to $G_{N1}$ existing in a second column through a second stream into a second GPU memory. That is, blocks of the same column are sequentially loaded into a GPU memory through the same stream.

Loading intervals of streams do not overlap each other. For example, referring back to FIG. 19, the computing device 100 repeatedly performs a process of loading the second stream when a process of loading the first stream is completed and loading a next stream when a process of loading the second stream is completed. When a process of loading a last stream is completed, a process of loading the first stream is performed again.

When there are M streams and M GPU memories, referring to FIG. 20, the $G_{00}$ block is loaded into the first GPU memory through the first stream, and the $G_{01}$ block is loaded into the second GPU memory through the second stream. In this way, a $G_{0M}$ block existing in an $M^{th}$ column of a first row is loaded into an $M^{th}$ GPU memory through an $M^{th}$ stream. The plurality of GPUs respectively calculate weights of blocks of first to $M^{th}$ columns of the first row loaded into the M GPU memories.

When weight calculation of the $G_{00}$ block loaded into the first GPU memory is completed, the computing device 100 loads the $G_{10}$ block existing in the same column as the $G_{00}$ block into the first GPU memory through the first stream, and the first GPU calculates a weight of the $G_{10}$ block loaded into the first GPU. In this way, the first GPU may sequentially calculate weights of the plurality of blocks $G_{00}$ to $G_{N0}$ existing in the first column and may accumulate and store the weights.

The second GPU calculates weights of the blocks $G_{01}$ to $G_{N1}$ of the second column sequentially loaded into the second GPU memory through the second stream, and the $M^{th}$ GPU calculates weights of the blocks $G_{0M}$ to $G_{NM}$ of the $M^{th}$ column sequentially loaded into the $M^{th}$ GPU through the $M^{th}$ stream.

When the number of columns (N) of blocks is greater than the number of streams (M<N), the computing device 100 may first perform block calculation on up to an $M^{th}$ column of graph data through M streams and then repeatedly perform a process of loading into a GPU memory through a first memory again from a block of an M+1th column. Because weights of blocks are calculated in parallel through a plurality of GPUs, a time required to calculate a pagerank of graph data may be reduced.

In a plurality of blocks into which graph data is divided, out-degree information and pagerank information of blocks existing in the same row are the same. Accordingly, loading of the out-degree information and the pagerank information may be performed only once. For example, as shown in FIG. 19, when a block of a first column is loaded into a GPU memory through a first stream, out-degree information and pagerank information corresponding to a source vertex of the block are also loaded into the GPU memory, and then only information of the block is loaded into the GPU memory in second and subsequent streams. In another embodiment, out-degree information and pagerank information may be loaded together with a block whenever loading is performed.

In another embodiment, because blocks are sequentially calculated in a column direction in the case of FIG. 18, the computing device 100 reads a plurality of blocks in a column direction among blocks of graph data existing in the auxiliary storage device 1800 and loads the plurality of blocks into the main memory 1810. In contrast, according to the present embodiment, because blocks of a plurality of columns are calculated in parallel through a plurality of streams, the computing device 100 may read blocks of graph data in units of rows and may load the blocks into the main memory. For example, the computing device loads blocks of a first row of graph data into the main memory. The computing device sequentially loads blocks of a first row into a plurality of GPU memories through a plurality of streams. In another embodiment, when the number of columns (N) of blocks is greater than the number of streams (M), the computing device may load blocks of first to $M^{th}$ columns of a first row in graph data into the main memory.

When weight calculation of the blocks of the first row stored in the main memory is competed through the plurality of GPUs, the computing device loads blocks of a second row from the auxiliary storage device into the main memory. In this way, the computing device may sequentially load up to blocks of an $N^{th}$ row into the main memory.

FIGS. 21 to 26 are diagrams illustrating a method of performing graph data calculation through a plurality of threads, according to an embodiment of the disclosure.

Because a GPU includes a plurality of cores and each core may execute one or more threads, in the present embodiment, a process of calculating graph data will be described from the perspective of a thread. For convenience of explanation, the present embodiment will be described assuming that there are three threads.

Figure 21:
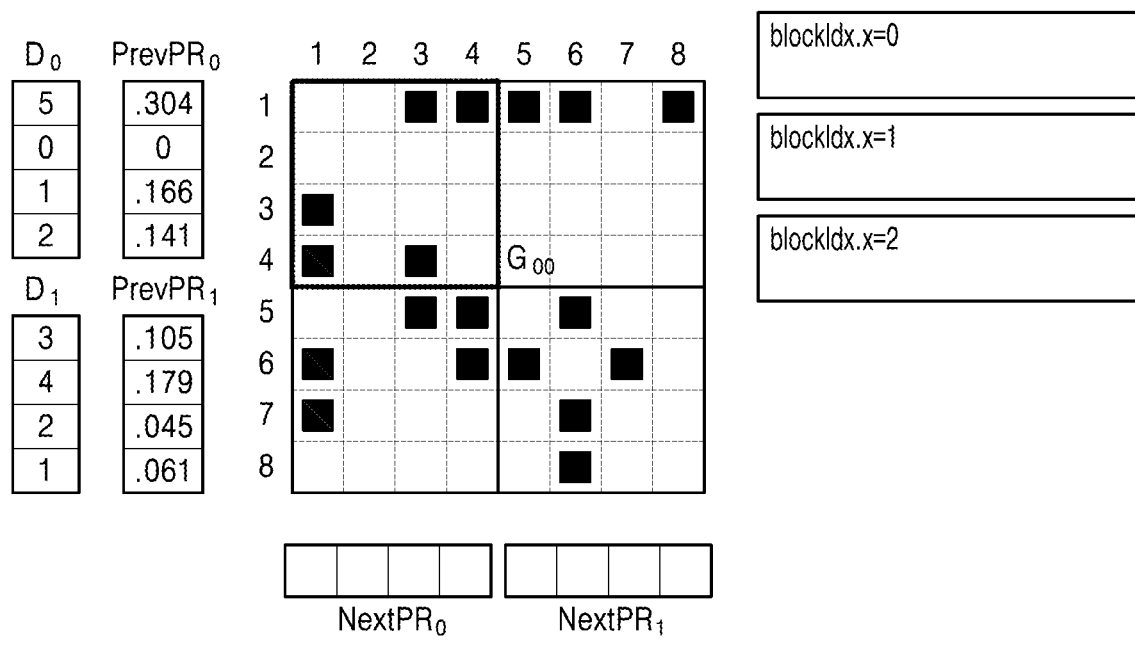
FIGS. 21 to 26 are diagrams illustrating a method of performing graph data calculation through a plurality of threads, according to an embodiment of the disclosure.

Referring to FIG. 21, the computing device 100 loads information of the $G_{00}$ block, and out-degree information and pagerank information of the block into a GPU memory.

Figure 22:
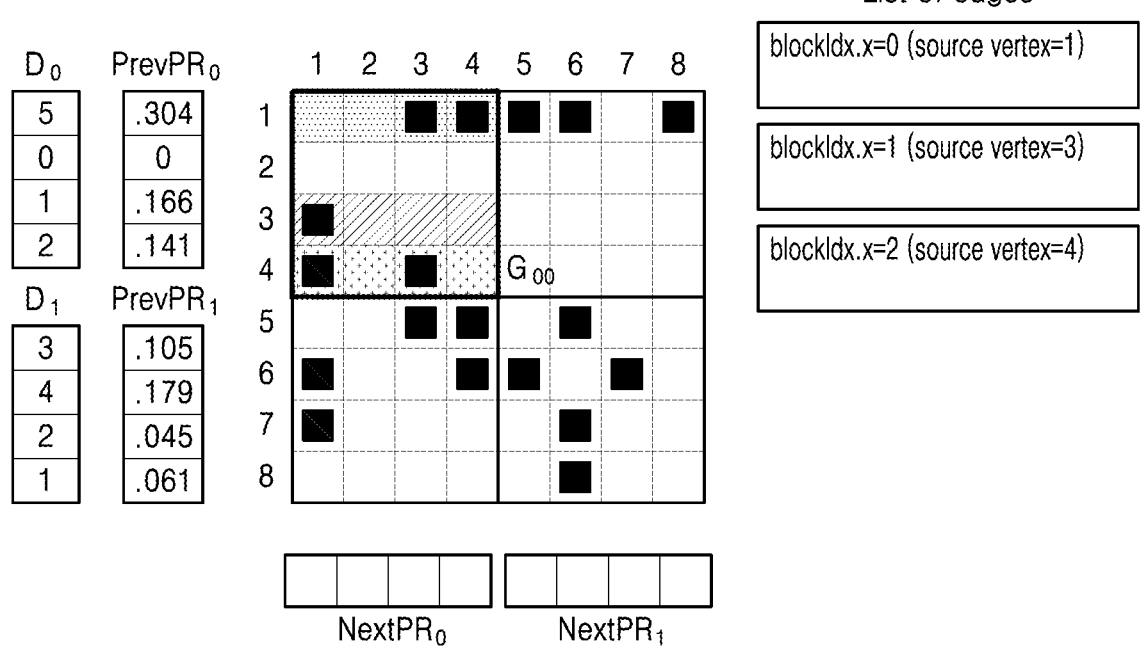

Referring to FIG. 22, each of a plurality of threads is assigned to calculate a weight of each row of blocks. Because there is no edge in a second row, three threads are respectively assigned to first, third, and fourth rows.

Figure 23:
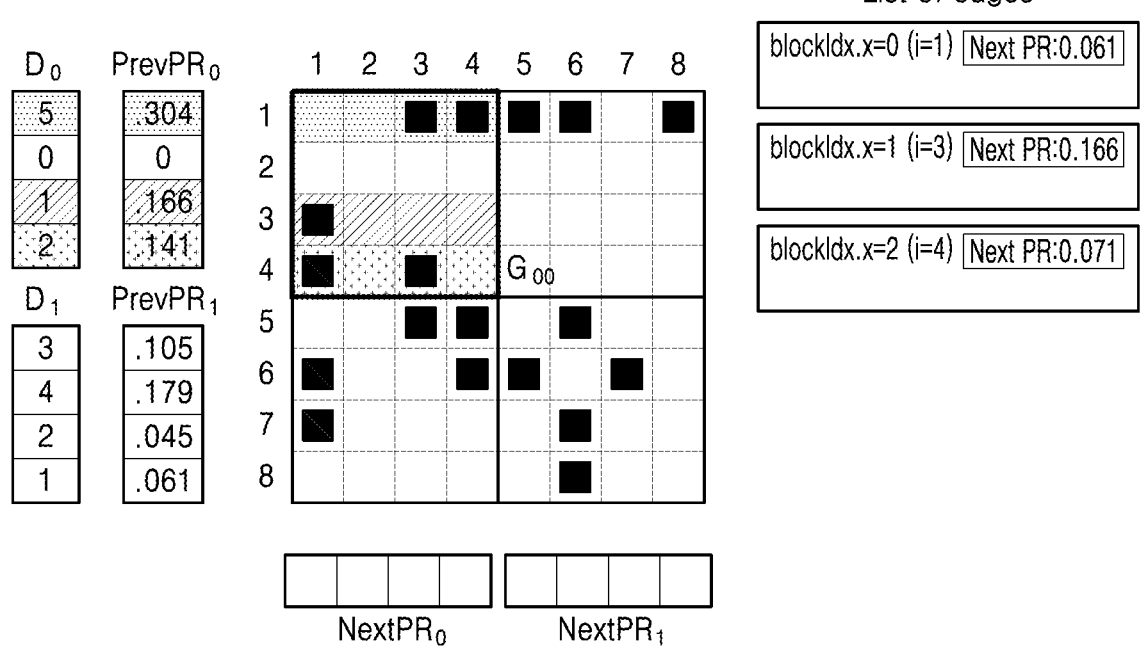

Referring to FIG. 23, each of the plurality of threads calculates a weight of a destination vertex of an edge existing in each row. For example, a first thread determines a value obtained by dividing a pagerank of a first vertex by an out-degree of the first vertex as a weight of a corresponding row. A second thread and a third thread respectively calculate weights of third and fourth rows.

Figure 24:
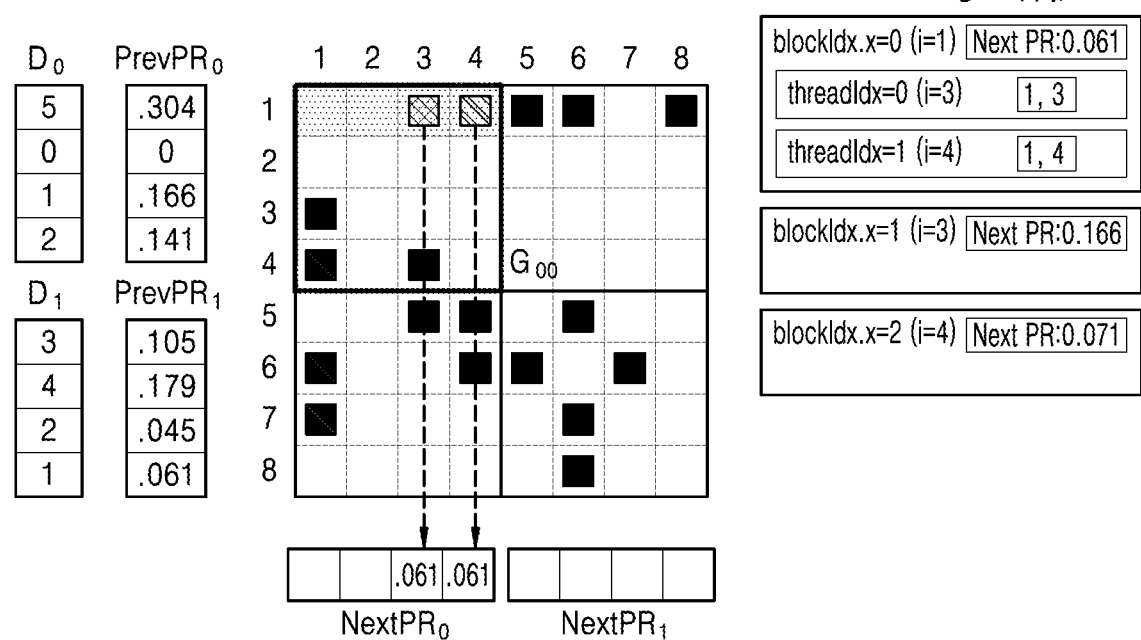
Figure 25:
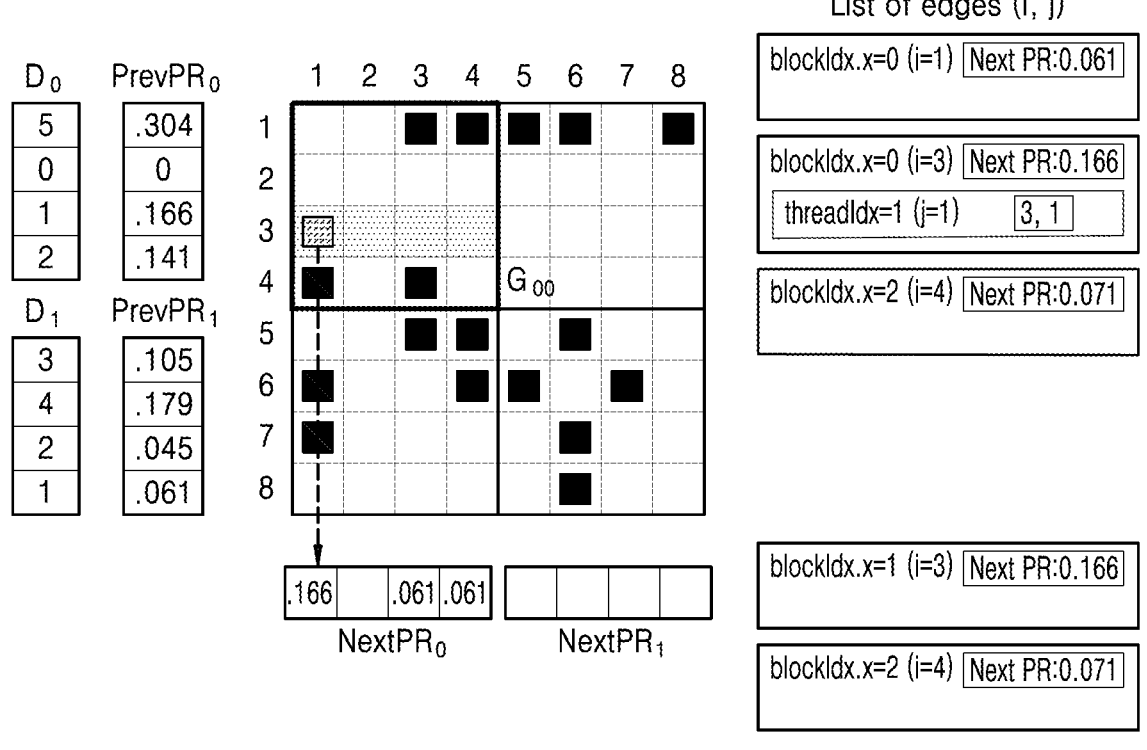
Figure 26:
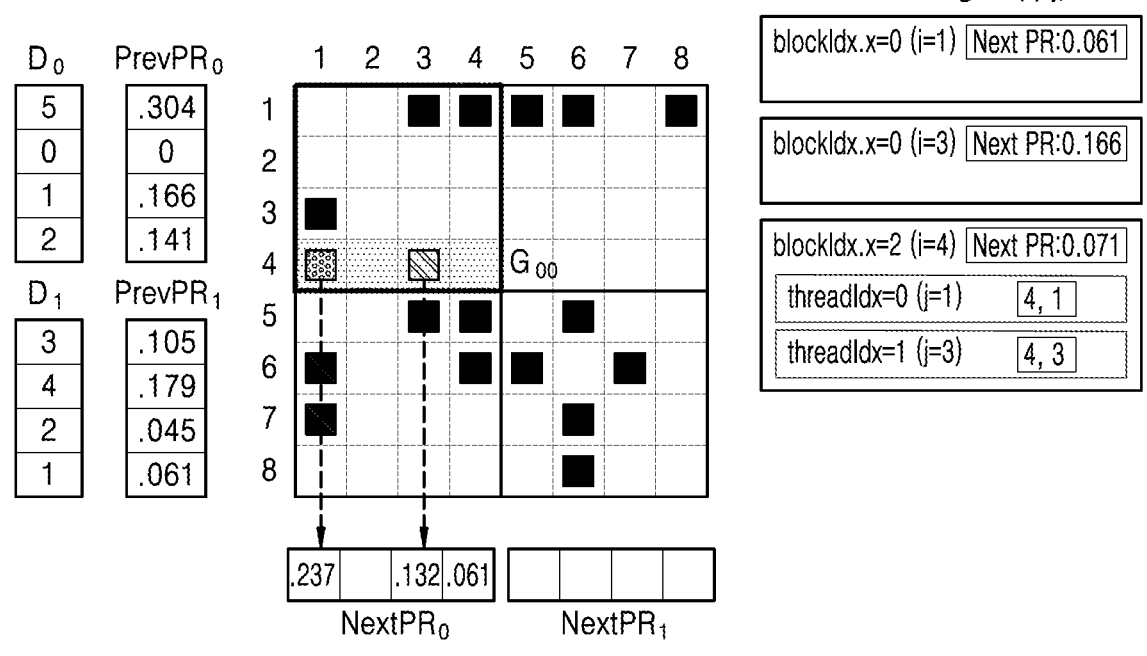

Referring to FIGS. 24 to 26, the first thread accumulates and stores, in a row vector, a weight of a destination vertex of an edge existing in the first row (FIG. 24). The second thread accumulates and stores, in the row vector, a weight of a destination vertex of an edge existing in the third row (FIG. 25). The third thread accumulates and stores, in the row vector, a weight of a destination vertex of an edge existing in the fourth row (FIG. 26).

When weight calculation of the block $G_{00}$ is completed, the computing device loads, into the GPU memory, information of the $G_{10}$ block and out-degree information and pagerank information of the $G_{10}$ block as shown in FIG. 9, and then calculates a weight of each row by using a plurality of threads again and accumulates and stores the weight in a row vector. In this way, the computing device may perform weight calculation in units of blocks.

FIG. 27 is a diagram illustrating an experimental example of calculation performance when a graph calculation method according to an embodiment of the disclosure is applied.

Referring to FIG. 27, a result of an experiment on a time required to calculate a pagerank by using regenerative medicine advanced therapy (RMAT) synthetic graph data, which is widely used as a graph processing performance benchmark, is shown. In the case of RMAT36, when the number of vertices is 68.7 B and the number of edges is 1.1 T, the size of graph data represented in an adjacency matrix format is 3.1 TB. In this case, a time required to calculate a pagerank of a vertex of a corresponding graph is 23 minutes.

The disclosure may also be embodied as computer-readable code on a computer-readable recording medium. The computer-readable recording medium includes any data storage device that may store data which may be thereafter read by a computer system. Examples of the computer-readable recording medium include a read-only memory (ROM), a random-access memory (RAM), a compact disk (CD)-ROM, a magnetic tape, a floppy disk, and an optical data storage device. The computer-readable recording medium may also be distributed over network coupled computer systems so that the computer-readable code is stored and executed in a distributive manner.

According to an embodiment of the disclosure, a time required to calculate a pagerank indicating a relative importance between vertices of a graph may be reduced. In another embodiment, distributed processing may be performed by using one or more graphics processing units (GPUs). Also, pagerank calculation may be performed on a graph including 1 trillion edges on a single machine.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the disclosure as defined by the following claims.

What is claimed is:

1. A graph data calculation method used by computing device comprising one or more memories, one or more processors, and one or more input/output devices to calculate a graph comprising edges each having a source vertex and a destination vertex, the graph data calculation method comprising:
   dividing graph data comprising a source vertex and a destination vertex of each edge into a plurality of blocks;
   identifying an out-degree of each source vertex in the graph;
   calculating, in units of blocks, a weight of a destination vertex of each edge by using a pagerank and an out-degree of a source vertex in the graph of each edge existing in a block; and
   updating the pagerank of each destination vertex of the graph data by accumulating weights of destination vertices of each block.

2. The graph data calculation method of claim 1, wherein the calculating is performed in units of blocks by one or more graphics processing units (GPUs).

3. The graph data calculation method of claim 1, wherein the dividing comprises recursively dividing the graph data so that a size of a block is equal to or less than a size of a GPU memory.

4. The graph data calculation method of claim 1, wherein the dividing comprises dividing an adjacency matrix in which source vertices and destination vertices of edges are expressed in rows and columns into a plurality of blocks.

5. The graph data calculation method of claim 4, wherein the calculating comprises performing, in units of blocks, a process of calculating weights of edges of each row existing in a block of the adjacency matrix by using pageranks and out-degrees of source vertex of each row and calculating a weight of a destination vertex of each edge for each block by accumulating the weights of the edge of each row in a column direction.

6. The graph data calculation method of claim 4, wherein the calculating is performed in units of blocks and in an order of a column direction.

7. The graph data calculation method of claim 1, wherein out-degree information for each block comprising out-degrees of source vertices of edges included in each block and pagerank information for each block comprising pageranks of the source vertices of the edges included in each block are included,
   wherein the calculating comprises calculating a weight based on block unit data comprising the out-degree information for each block, the pagerank information for each block, and graph data for each block.

8. The graph data calculation method of claim 7, wherein the calculating comprises:
   loading the block unit data into one or more GPU memories; and
   calculating, by one or more GPU, weights in units of blocks by using the block unit data loaded into the GPU memories.

9. The graph data calculation method of claim 7, wherein
   the dividing comprises dividing the graph data into a plurality of blocks based on a source vertex and a destination vertex, and
   the loading comprises loading the plurality of blocks into a plurality of GPU memories through a plurality of streams.

10. The graph data calculation method of claim 1, wherein the calculating and the updating are repeatedly performed a predefined number of times or until a predefined condition is satisfied.

11. A computing device comprising:
   a main memory storing a plurality of blocks into which graph data comprising edges each having a source vertex and a destination vertex are divided, an out-degree of each source vertex, and a pagerank of each source vertex;
   one or more graphics processing units (GPUs) configured to calculate, in units of blocks, a weight of a destination vertex of each edge by using a pagerank and an out-degree of a source vertex of each edge existing in a block; and
   a processor configured to update a pagerank of each source vertex of the graph data by accumulating weights of destination vertices of each block.

12. The computing device of claim 11, wherein the processor is further configured to recursively divide the graph data so that a size of a block is equal to or less than a size of a GPU memory.

13. The computing device of claim 11, wherein the main memory stores out-degree information for each block comprising out-degrees of source vertices of edges included in each block and pagerank information for each block comprising pageranks of the source vertices of the edges included in each block,
   wherein the one or more GPUs are further configured to calculate a weight based on block unit data comprising the out-degree information for each block, the pagerank information for each block, and graph data for each block.

14. The computing device of claim 11, wherein the main memory comprises a plurality of blocks into which the graph is divided based on a source vertex and a destination vertex,
   wherein the processor is further configured to load a plurality of block unit data into a plurality of GPU memories through a plurality of streams.

15. A non-transitory computer-readable recording medium having recorded thereon a computer program for performing the graph data calculation method of claim 1.

\* \* \* \* \*